United States Patent
Awaad et al.

(10) Patent No.: US 9,073,500 B2
(45) Date of Patent: Jul. 7, 2015

(54) THERMAL INSULATION CONSTRUCTION AND A METHOD FOR THE PREPARATION THEREOF

(71) Applicant: King Saud University, Riyadh (SA)

(72) Inventors: Amani S. Awaad, Riyadh (SA); Reham Moustafa El-Meligy, Riyadh (SA); Sara H. Alqahtani, Riyadh (SA); Hessa E. Alduhailan, Riyadh (SA)

(73) Assignee: King Saud University, Riyadh (SA)

( * ) Notice: Subject to any disclaimer, the term of this patent is extended or adjusted under 35 U.S.C. 154(b) by 155 days.

(21) Appl. No.: 14/021,016

(22) Filed: Sep. 9, 2013

(65) Prior Publication Data

US 2014/0077118 A1 Mar. 20, 2014

(30) Foreign Application Priority Data

Sep. 17, 2012 (EP) ..................... 12184712

(51) Int. Cl.
*B60R 13/08* (2006.01)
*E04B 1/76* (2006.01)
*E04C 2/16* (2006.01)
*E04B 1/74* (2006.01)

(52) U.S. Cl.
CPC ........... *B60R 13/0815* (2013.01); *E04B 1/7675* (2013.01); *E04B 1/76* (2013.01); *E04C 2/16* (2013.01); *E04B 2001/745* (2013.01)

(58) Field of Classification Search
CPC ......... B60R 13/0815; E04C 2/16; E04B 1/76; E04B 1/7675; E04B 2001/745
See application file for complete search history.

(56) References Cited

U.S. PATENT DOCUMENTS 7,776,368 B2 *  8/2010  Hamann ........................ 424/744
2005/0048279 A1 *  3/2005  Watson et al. ................ 428/332

* cited by examiner

*Primary Examiner* — Carol M Koslow
(74) *Attorney, Agent, or Firm* — Renner, Otto, Boisselle & Sklar, LLP

(57) ABSTRACT

The present invention relates to a thermal insulation construction comprising a support and a thermal insulation layer thereon, wherein the thermal insulation layer comprises an extract from a plant material obtainable from *Aloe Vera*, a method for the preparation thereof and its use, in particular, for thermal insulating a vehicle interior.

15 Claims, 2 Drawing Sheets

THERMAL INSULATION CONSTRUCTION AND A METHOD FOR THE PREPARATION THEREOF

CROSS-REFERENCE TO RELATED APPLICATION

The present application claims benefit to and priority under 35 U.S.C. §119 of European Application No. 12184712.3, filed 17 Sep. 2012, the entirety of which is hereby incorporated herein by reference.

TECHNICAL FIELD

The present inventions relates to a thermal insulation construction, a method for the preparation thereof and its use for insulating an interior, in particular for thermal insulating a vehicle interior.

BACKGROUND

Many regions, for example the Gulf Countries and most Arab areas, suffer from very high temperatures, especially in summer. High temperatures have a negative impact on vehicle functionality by elevating the temperature of the internal components which reduces the efficiency of the vehicle and increases the fuel consumption. Thermal insulators used so far suffer from non satisfying efficiency and are prepared from artificial materials in an energy consuming way. Thus, there is a great interest in alternative car insulators, obtainable from natural material in an easy and gentle way.

The *Aloe Vera* plant has been known and used for centuries due to its health, medical and skin care properties. *Aloe Vera* has been used for medicinal proposals in several cultures for millennia, for example in ancient Greece or Egypt. By the early 1800's, *Aloe Vera* was used as a laxative in the United States. From the mid of the twentieth century, it was also successfully used to treat chronic and severe radiation dermatitis.

The botanical name of *Aloe vera* is *Aloe barbadensis miller*. It belongs to the Asphodelaceae (Liliaceae) family, and is a shrubby or arborescent, perennial, xerophytic, succulent, pea- green color plant. It grows mainly in the dry regions of Africa, Asia, Europe and America.

SUMMARY

It is an object of the present invention to provide a thermal insulation construction which overcomes the drawbacks of the prior art. In particular, a thermal insulator shall be provided allowing the thermal insulation of an interior in an easy, cost efficient and sustainable way.

This object is achieved by a thermal insulation construction comprising a support and a thermal insulation layer thereon, wherein the thermal insulation layer comprises an extract from a plant material obtainable from *Aloe Vera*. It should be clear that the extract, after being applied to support, is present in dry form.

A person skilled in the art will be aware that the inventive thermal insulation construction can comprise more than one thermal insulation layer. Particularly, the thermal insulation construction can comprise a variety of consecutive thermal insulation layers to achieve an improved thermal insulation effect. However, the person skilled in the art will also be aware that a multiple thermal insulation layer structure can possibly come along with stability problems, for example due to softening of the multiple thermal insulation layer structure at higher temperatures. Therefore, according to the present invention, it can be provided to separate a variety of thermal insulation layers by stable interlayers or by separate compartments.

Preferably, the overall thickness of the thermal insulation layer or of the thermal insulation layers is within a range of 0.1-0.3 cm. If the thickness is more than 0.3 cm, it is very likely that the layer will be cracked and affects insulation activity of the extract.

Further, according to the present invention, more than one extract from *Aloe Vera*, or at least parts of *Aloe Vera*, can be used to achieve the thermal insulation layer. In the same way, a person skilled in the art will be aware that the extract can be mixed with other known thermal insulators.

The inventive thermal insulation construction can further comprise a protective layer covering the thermal insulation layer. In this way, a loss of the thermal insulation layer or its deterioration by contact with the environment, for example by abrasion or corrosion, can be avoided. The protective layer can, for example, be a vanish, deposited on the thermal insulation layer.

*Aloe Vera* contains a very special squeeze which is mainly composed of cutin, and which successfully protects the plant from blazing sun in the desert and from dryness.

As support, any solid material able to form an interior and to be coated by the thermal insulation layer can be selected. The support can have a homogeneous or a heterogeneous structure.

Preferably, the support is a support having a heterogeneous structure.

That is, the support itself can comprise a multilayer structure, including, for example, different metals, plastics, resins or there like. The support can also comprise two or more different sections, each of which being made of one or more different materials.

Particularly preferred, the support is an exoskeleton of a vehicle.

It can be preferred that the support or the exoskeleton substantially comprise metal.

Even preferred, the extract is obtainable by extracting the plant material with an organic solvent.

Even more preferred, the organic solvent is an nonpolar organic solvent.

In terms of the present invention, an nonpolar organic solvent is a solvent not or only poorly mixable with water, for example pentane, hexane, heptane, cyclohexane, toluol, benzene, diethylether, dichloromethan, chloroform, tert-butylmethyl ester, methylethyl ketone, acetone, dioxan, tetrahydrofuran, ethylacetate etc.

Preferably, the organic solvent is chloroform and/or petroleum ether.

Most preferably, the organic solvent of choice is a mixture of chloroform and petroleum ether having a chloroform/petroleum ether ratio of 0.1 to 10 by volume, most preferably 1:1 by volume.

In general, any known extraction method can be used for preparing the extract from the plant material obtainable from *Aloe Vera*.

In a preferred embodiment, the plant material comprises at least parts of the leaves of *Aloe Vera*.

To achieve a better blending of the organic solvent and the plant material, the plant material can be crushed, grinded, hacked etc., before extraction procedure. Extracting can be percolating, soxhlet extraction, extraction by using a separating funnel, by shacking the plant material in the presence of the organic solvent followed by separating the plant material residue from the extract by decantating etc.

In a particularly preferred embodiment, extracting is percolating.

The term extract also comprises liquids obtainable by pressing *Aloe Vera* or parts of it or mixtures comprising suitable homogeneousated material from *Aloe Vera*.

The object is further achieved by a method for preparing the inventive thermal insulation construction, comprising a) providing a support, b) coating the support with a composition comprising at least parts of the extract from a plant material obtainable from *Aloe Vera*, c) obtaining the thermal insulation layer from the composition coated on the support.

Coating the support with a mixture comprising the extract can be carried out by any suitable coating methods known in the art. For example, coating can be spraying, dipcoating, painting, spin-coating, roll-to-roll-coating etc. Preferably, coating is painting, that is, spreading the mixture on the support by means of a brush, role etc.

In a preferred embodiment, step c) comprises removal of volatile constituents of the composition.

The removal can be achieved by simply exposing the coated support to air at room temperature, but also by heating the coated support, by exposing the coated support to moved gas, for example air, by exposure to vacuum etc.

Volatile constituents in terms of the present invention are low molecular weight compounds which can be easily removed by the methods listed above, in particular by drying the coated support by exposure to air at room temperature.

Finally, the object is achieved by the use of the inventive thermal insulation construction for thermal insulating an interior.

The interior can be any interior, for example a box, a house or the room of a house, a vehicle interior etc.

Preferably, the interior is a vehicle interior.

The invention will now be described in more detail by the examples with intention to exemplify the invention. The examples, however, are not intended to have any limiting effect on the subject matter of the claims or on the scope of protection.

Figure 1:
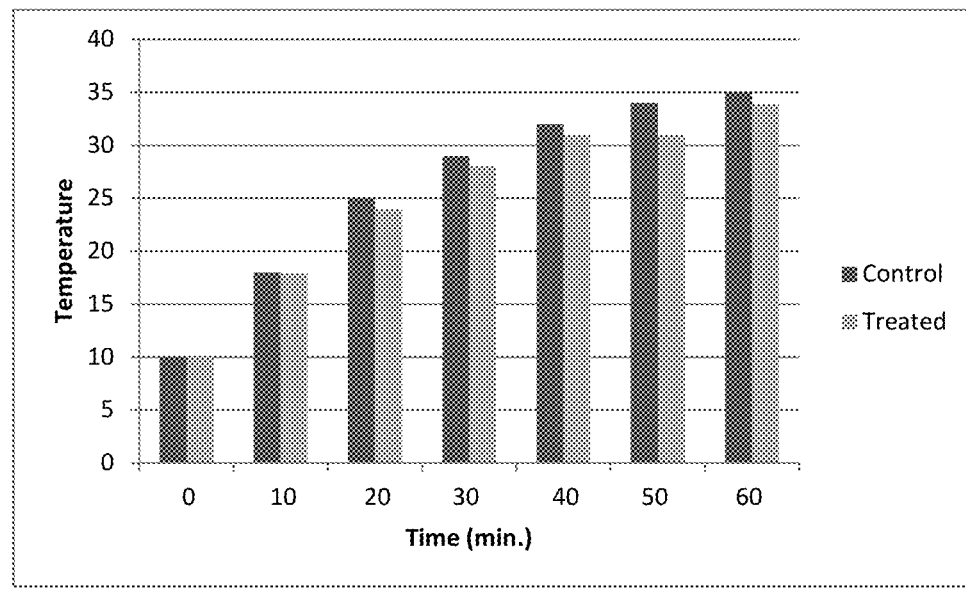
FIG. 1 is a graph depicting temperature vs. time for an interval of 10 minutes for control boxes and boxes treated according to an embodiment of the present invention.
Figure 2:
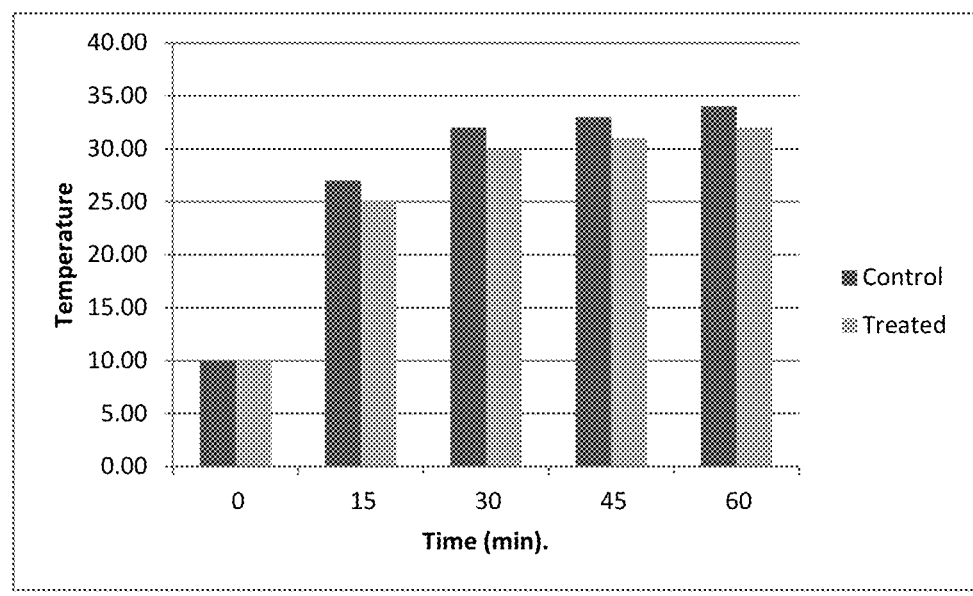
FIG. 2 is a graph depicting temperature vs. time for an interval of 15 minutes for control boxes and boxes treated according to an embodiment of the present invention.
Figure 3:
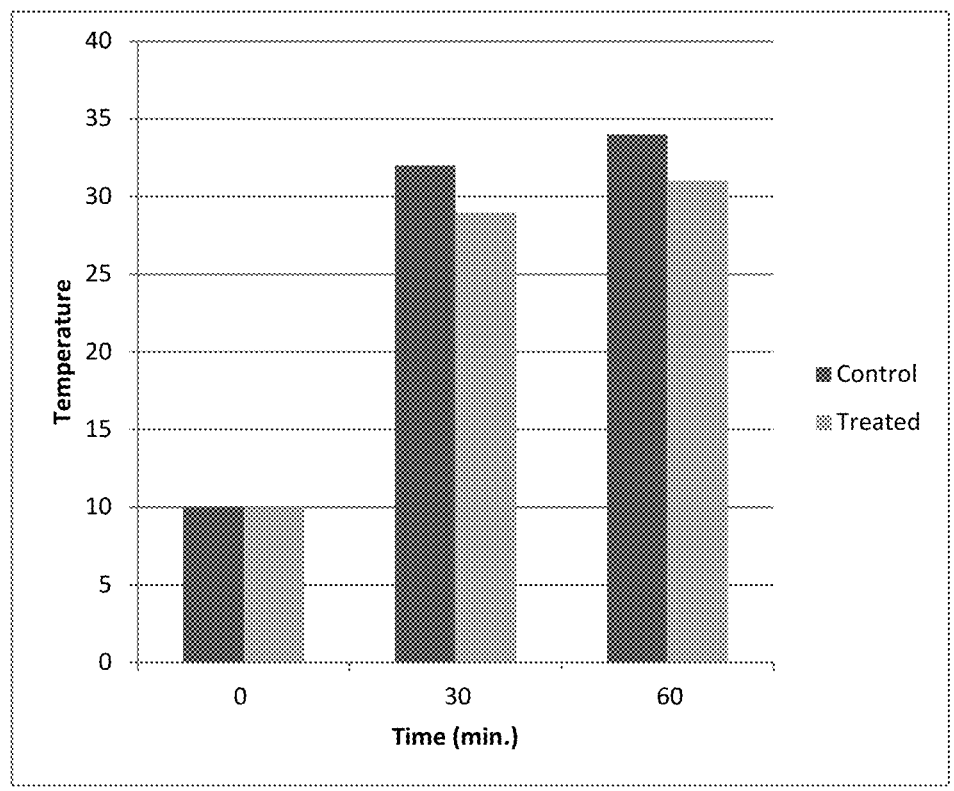
FIG. 3 is a graph depicting temperature vs. time for an interval of 30 minutes for control boxes and boxes treated according to an embodiment of the present invention.
Figure 4:
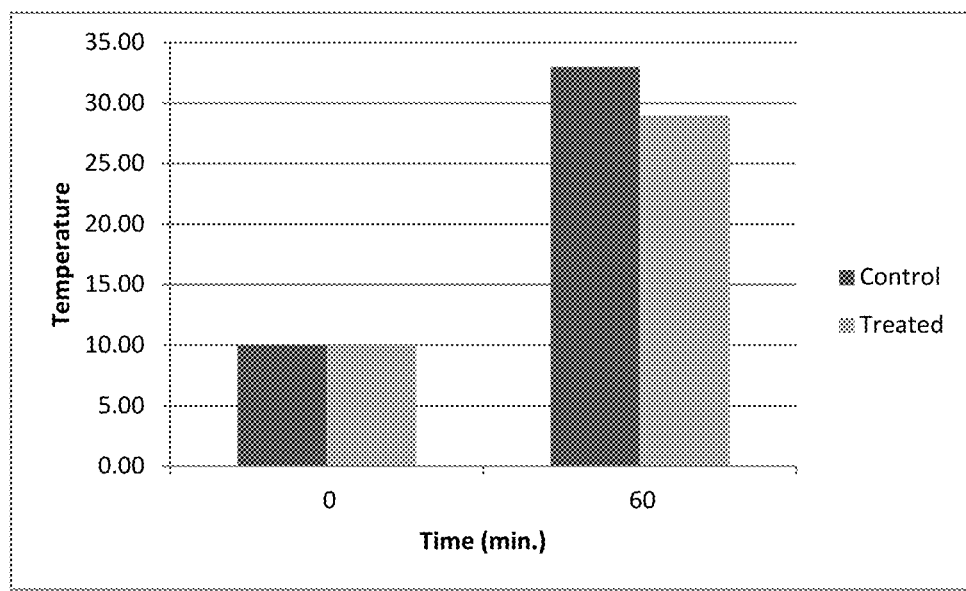
FIG. 4 is a graph depicting temperature vs. time for an interval of 60 minutes for control boxes and boxes treated according to an embodiment of the present invention.

In the examples, reference is made to the FIGS. 1 to 4, showing the inside temperature of two groups of boxes, made of the exoskeleton of a car and exposed to sunlight for at least 60 minutes. While the first group of boxes was made of the pristine exoskeleton of a car (control), the other group of boxes was made of the inventive thermal insulation construction (treated). Temperatures were measured by opening the boxes using a thermometer. Different intervals of 10 min (FIG. 1), 15 min (FIG. 2), 30 min (FIGS. 3) and 60 min (FIG. 4) for a temperature measurement were chosen.

EXAMPLES

Plant Materials:

Leaves of *Aloe barbadensis* miller ("*Aloe Vera*") (4 kg) were obtained from the Department of Gardens and Landscape Architecture of the Secretariat of Riyadh region. The leaves were cutted into small pieces and extracted afterwards.

Extraction:

Leaves of *Aloe Vera* were extracted by percolation, using chloroform and petroleum ether (1:1, v/v) at room temperature for two days. The extract was filtered off and the residues were re-percolated for four times. The collected extracts were concentrated under reduced pressure at a temperature not exceeding 35° C. to yield 57 g of extract.

Boxes:

Boxes were made of the exoskeleton of a car (TOYOTA, CAMRY model 2011).

The size of each box was 6×6 cm. One group of boxes in each experiment were painted with the obtained extract and left to dry before performing the experiment (treated). The other boxes were kept without painting and considered as control group (control). Thickness of each thermal insulation layer was about 0.15 cm.

Thermal Insulation Measurements:

Two groups of boxes were used, control group and treated group. The experiments were done under direct sunlight for 60 minutes. Each box was filled with 50 ml cold water (10° C.). Measurements were taken within different intervals (10, 15, 30 and 60 minutes) and the atmospheric temperature was measured using a regular mercury thermometer by opening the boxes.

Each experiment was preferred at least three times; the means and SD were calculated.

Statistical Analysis:

All values were expressed as mean ±S.D. Each treated group was compared with its corresponding control group in the corresponding time. Comparisons between means were carried out using Student t' test using SPSS, version 14.

Results and Discussion:

The temperatures inside the control and treated boxes differed by time. The atmospheric temperature was 34±0.08. The insulation efficacy of the tested extract appeared after 60 min. in different time intervals. The maximum efficacy was at the intervals of 60 min as the different in temperatures was 4° C. However the minimum efficacy was at the time intervals of 10 min as the different in temperatures was 1° C. (Table 1). From these results, it can be concluded that; as the intervals of opening the boxes increase, the different in temperatures inside boxes increase and so the insulation efficacy increase. All the treated boxes were significantly different from the corresponding control at different probabilities (0.05, 0.01 & 0.001) except after 10 min.

TABLE 1

Temperatures inside boxes at different time and different time intervals

| Time (min) | Intervals (min) | | | | | | | |
|---|---|---|---|---|---|---|---|---|
| | 10 | | 15 | | 30 | | 60 | |
| | Control | Treated | Control | Treated | Control | Treated | Control | Treated |
| 0 | 10.0 ± 0.42 | 10.0 ± 0.26 | 10.0 ± 0.02 | 10.0 ± 0.06 | 10.0 ± 0.06 | 10.0 ± 0.15 | 10.0 ± 0.06 | 10.0 ± 0.03 |
| 10 | 18.0 ± 0.10 | 17.9 ± 0.12 | | | | | | |
| 15 | | | 27.0 ± 0.02 | 25.0 ± 0.03*** | | | | |
| 20 | 25.0 ± 0.15 | 24.0 ± 0.10*** | | | | | | |
| 30 | 29.0 ± 0.08 | 28.0 ± 0.05*** | 32.0 ± 0.07 | 30.0 ± 0.04*** | 32.0 ± 0.06 | 29.0 ± 0.06*** | | |
| 40 | 32.0 ± 0.06 | 31.0 ± 0.03*** | | | | | | |

TABLE 1-continued

Temperatures inside boxes at different time and different time intervals

| Time (min) | Intervals (min) | | | | | | | |
|---|---|---|---|---|---|---|---|---|
| | 10 | | 15 | | 30 | | 60 | |
| | Control | Treated | Control | Treated | Control | Treated | Control | Treated |
| 45 | | | 33.0 ± 0.10 | 31.0 ± 0.07*** | | | | |
| 50 | 34.0 ± 0.15 | 31.0 ± 0.15** | | | | | | |
| 60 | 35.0 ± 0.25 | 33.9 ± 0.10** | 34.0 ± 0.11 | 32.0 ± 0.08*** | 34.0 ± 0.11 | 31.0 ± 0.05*** | 33.0 ± 0.06 | 29.0 ± 0.01*** |

Temperatures inside boxes are expressed as mean ± SD.
*$p < 0.05$, $p < 0.01$, *$p < 0.001$ compared with respective control, compared with corresponding control.

Features of the present invention disclosed in the description and/or the claims may both, separately and in any combination thereof, be material for realizing the invention in various forms thereof.

The invention claimed is:

1. Thermal insulation construction comprising a support and a thermal insulation layer thereon, wherein the thermal insulation layer comprises an extract from a plant material obtainable from *Aloe Vera*.

2. Thermal insulation construction according to claim 1, wherein the support is a support having a heterogeneous structure.

3. Thermal insulation construction according to claim 2, wherein the support is an exoskeleton of a vehicle.

4. Thermal insulation construction according to claim 1, wherein the extract is obtainable by extracting the plant material with an organic solvent.

5. Thermal insulation construction according to claim 4, wherein the organic solvent is a nonpolar organic solvent.

6. Thermal insulation construction according to claim 4, wherein the organic solvent is chloroform and/or petroleum ether.

7. Thermal insulation construction according to claim 6, wherein extracting is percolating.

8. Thermal insulation construction according to claim 4, wherein extracting is percolating.

9. Thermal insulation construction according to claim 1, wherein the plant material comprises at least parts of the leaves of *Aloe Vera*.

10. Method for preparing a thermal insulation construction according to claim 1, comprising
    a) providing a support,
    b) coating the support with a composition comprising at least parts of the extract from a plant material obtainable from *Aloe Vera*,
    c) obtaining the thermal insulation layer from the composition coated on the support.

11. Method according to claim 10, wherein step c) comprises removal of volatile constituents of the composition.

12. Method for preparing a thermal insulation construction according to claim 10 wherein the extract is obtained by extracting the plant material with an organic solvent.

13. Method according to claim 12 wherein the organic solvent is a nonpolar organic solvent.

14. Method of thermal insulating an interior comprising applying the thermal insulation layer of claim 1 to the interior.

15. Method according to claim 14, wherein the interior is a vehicle interior.

* * * * *